United States Patent [19]

Altmann

[11] 4,122,358
[45] Oct. 24, 1978

[54] SUPERVISORY SYSTEM FOR A DATA TRANSMISSION SYSTEM

[75] Inventor: William Altmann, Maidenhead, England

[73] Assignee: Plessey Handel und Investments AG, Zug, Switzerland

[21] Appl. No.: 791,532

[22] Filed: Apr. 27, 1977

[30] Foreign Application Priority Data

Apr. 29, 1976 [GB] United Kingdom ............. 17560/76

[51] Int. Cl.$^2$ .......................................... H04B 3/46
[52] U.S. Cl. ........................... 340/146.1 C; 178/70 R; 179/175.31 R
[58] Field of Search ............ 340/146.1 BE, 146.1 C; 235/153 AE; 179/15 BF, 15 AE, 175.31 R; 178/70 R

[56] References Cited

U.S. PATENT DOCUMENTS

| | | | |
|---|---|---|---|
| 3,370,270 | 2/1968 | Cesareo | 340/146.1 BE |
| 3,586,968 | 6/1971 | Barjot | 179/175.31 R |
| 3,637,955 | 1/1972 | Tilly et al. | 179/175.31 R |
| 3,649,777 | 3/1972 | Matsushima | 179/175.31 R |
| 3,976,835 | 8/1976 | Larner et al. | 178/70 R |
| 4,006,320 | 1/1977 | Markl | 179/15 BF |
| 4,017,828 | 4/1977 | Watanabe et al. | 340/146.1 BE |

*Primary Examiner*—Charles E. Atkinson
*Attorney, Agent, or Firm*—Fleit & Jacobson

[57] ABSTRACT

In a data-transmission route involving parallel (e.g. 8Mb/s) data-transmission systems each using a separate line pair, a common line pair, linking all terminal and repeater stations, is used for supervisory and control purposes (signals up to say 25 KHz) and each of e.g. 100 repeater stations (provided with a digital regenerator per data-line pair) has a single error-detection and a single interrogate/response signal circuit at the station. Additionally each repeater station has selection means for connecting the output side of any of the regenerators of the station to the error detector which is permanently associated with the interrogate/response circuit. After the identical setting of the selecting means at each repeater station (e.g. by dial signals forthcoming over the common pair or by an audio tone forthcoming over the data transmission path) an interrogate pulse (1mS 25 KHz), also transmitted over said pair from a terminal station, is effective in the nearest repeater station to develop a backward response signal and to advance an interrogate signal to the next (2nd) repeater station. All interrogate and response signals, appropriate to the selected transmission pair at each repeater station, makes use of the common line pair, so that the interrogating terminal station receives over that pair a sequence of signals which serves to report the existence and the location of any reportable transmission faults which develop in the selected data line.

4 Claims, 4 Drawing Figures

SUPERVISORY SYSTEM FOR A DATA TRANSMISSION SYSTEM

The present invention relates to a supervisory system for a data transmission system employing repeater stations along its route, and in which the data transmission is effected over paired or coaxial cables constituting the transmission media.

In a data transmission system of this kind, two main types of repeaters may be used namely (a) dependent repeaters which require to be fed with power over the transmission media, and (b) so-called intermediate or power-feeding repeaters which have integral power supplies and which, in conjunction with terminal station equipments, provide the electrical powersupplies for the whole system.

One form of supervisory system which performs monitoring and status reporting functions, in respect of a transmission system employing data transmission in the form of so-called redundancy codes and using dependent and power-feeding repeaters, is disclosed in U.S. Pat. No. 3,976,835, incorporated by reference herein. In that system each digital regenerator, of each repeater of both types has associated with it an error detector. The error detector performs a continuous monitoring function of the regenerator's output and produces a fault status signal in the event of either of two conditions arising, namely (a) that the output of the digital regenerator has ceased or (b) that an error-rate-limit has been reached in respect of digital-transmission code violations. In the known system, status interrogation in respect of the whole system is for example, effected from a particular end (terminal station) at regular intervals (typically 5 seconds) by an 'interrogate' signal-pulse developed thereat at these intervals and subjected to regeneration at each repeater involved and extended to its successor. The repeater, upon detecting an interrogate signal at a particular access path, is required to return a response or 'answer' signal (indicative of the prevailing status) to that access path for extension to the interrogating terminal station by any intervening repeaters; signal regeneration processes being employed at the repeaters involved.

An object of the present invention is to provide a reliable supervisory system for effecting in-traffic fault location in a digital data-transmission system.

According to the present invention there is provided a supervisory system for fault location in a digital data transmission system during transmission of data, the transmission system includes a plurality of separate data transmission paths each including a plurality of repeaters connected therein, each of which includes at least one digital regenerator, and the supervisory system is provided in common to serve corresponding repeaters in separate transmission paths and includes selection means which is controlled by at least one command signal from a terminal station at one or other of the ends of the transmission path to connect one of the data transmission paths exclusively to the supervisory system to enable investigation of the relevant transmission path for fault location purposes.

The invention will be better understood from the following description of two methods of putting the invention into effect and should be read in conjunction with the accompanying drawings in which.

The proposed supervisory system is applicable to a data transmission system operating at, typically, 8Mb/s and utilizing the fault location methods developed for the 120Mb/s data transmission system disclosed in U.S. Pat. No. 3,976,835. In that system, error rate during data transmission and presence of the output signal at each location are monitored, the information being transmitted to the controlling terminal after receipt of a periodic interrogation signal from that terminal. Both interrogation and answer pulses are in the form of 25 KHz pulses lasting approximately 1 msec and are transmitted via the power path of the coaxial line transmission system. In the proposed supervisory system, interrogation INT and answer ANS signals are transmitted on a supervisory pair SSP provided exclusively for that purpose. The circuit concerned with these signals is the interrogate and answer circuit INAN, the 25 KHz onward signals being provided by the oscillator OSC.

To locate a fault or deficiency (excessive error-rate) on one of the transmission-paths, the supervisory circuitry, which is at the same locations as the digital regenerators in corresponding repeaters, is connected to the outputs of the regenerators DR1, DR2 to DRN of one of transmission paths TP1, TP2 to TPN (FIG. 1 and FIG. 4), under investigation. The connection is performed by sending a command signal from one of terminals to the supervisory circuitry. The command signal can be transmitted either as a low-frequency signal in continuous or pulsed form on the supervisory path (FIG. 1) or it can be transmitted as a tone over the transmission path under investigation (FIG. 4).

Figure 1:
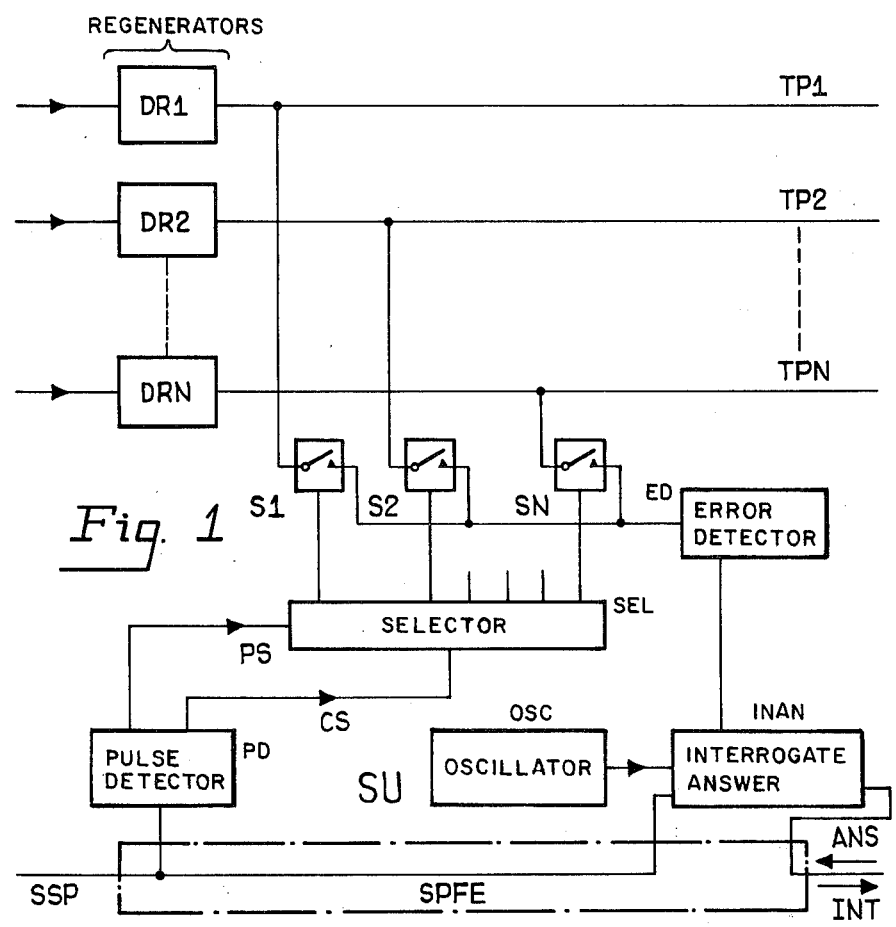
FIG. 1 Illustrates one method of putting the invention into effect involving signalling over a separate supervisory pair.

In FIG. 1, dialling-pulses, modulated on a suitable audio frequency, are transmitted on the supervisory pair SSP and the pulse detector PD steps the selector SEL in accordance with the number of pulses received. The appropriate selected output of the selector SEL actuates an electronic switch, one of S1, S2 to SN, which connects the appropriate output of one of the digital regenerators DR1, DR2 to DRN of a respective transmission path to the error detector ED, whereupon signal monitoring is then performed in a way similar in principle to that disclosed in U.S. Pat. No. 3,976,835. The error detector is of the type disclosed in U.S. Pat. No. 3,976,835, incorporated by reference herein.

Figure 2:
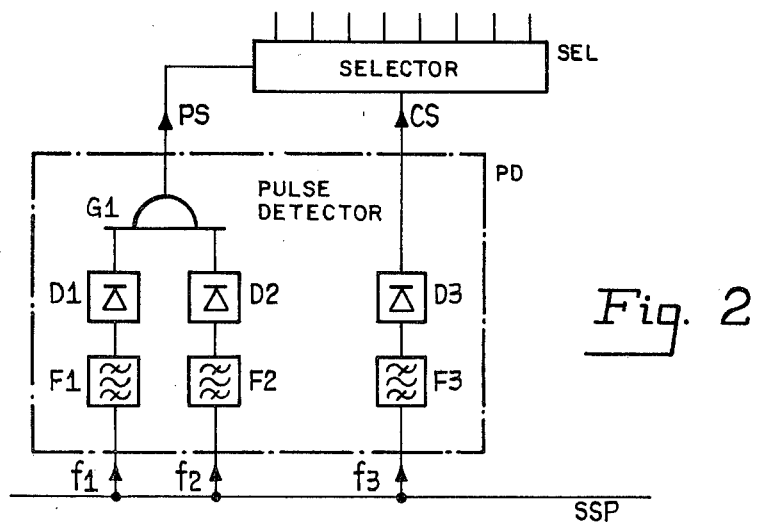
FIG. 2 Illustrates the details of a pulse detector as employed in the method of FIG. 1.

In order to minimise the possibility of false operation of the pulse detector PD, the dialling pulses consist, typically, of at least two frequencies $f1$ and $f2$ (see FIG. 2) transmitted simultaneously. These frequencies are filtered by band-pass filters F1 and F2 and detected by detectors D1 and D2. Gate G1 is operated and appropriate pulses PS delivered to step the selector SEL. At the end of the supervisory operation, a clear signal CS, represented by the single frequency $f3$, filtered by band-pass filter F3 and detected by the detector D3, resets the selector SEL to zero position.

Figure 4:
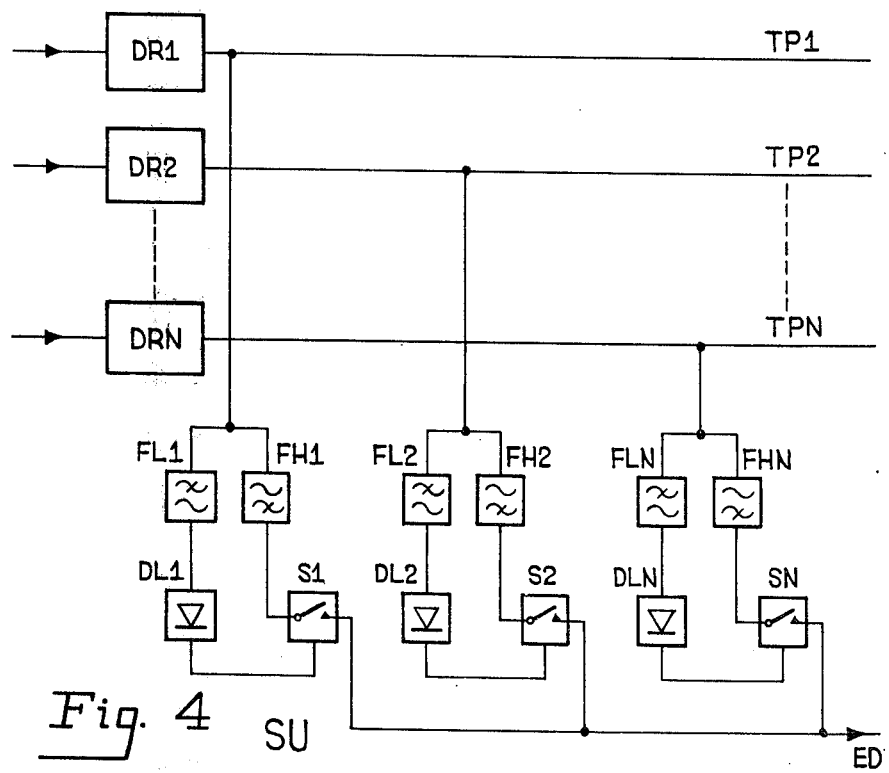
FIG. 4 Illustrates a further method of putting the invention into effect involving signalling over the transmission path.

In FIG. 4 the switch actuating signal is transmitted as an audio tone on the digital transmission-path, one of TP1, TP2 to TPN. A simple filtering arrangement involving low-pass filters FL1, FL2 to FLN and detectors DL1, DL2 to DLN respectively, extracts the tone to actuate the appropriate switch one of S1, S2 to SN. High-pass filters FH1, FH2 to FHN are provided to extract the data from transmission-paths TP1, TP2 to TPN, as appropriate, to be connected by way of the appropriate switch, S1, S2 to SN, to the error detector ED. The switches and their associated actuating circuitry can, in this case, be considered as being part of the supervisory unit or as part of the respective digital regenerator and can be physically accommodated in either unit, depending on design convenience.

Figure 3:
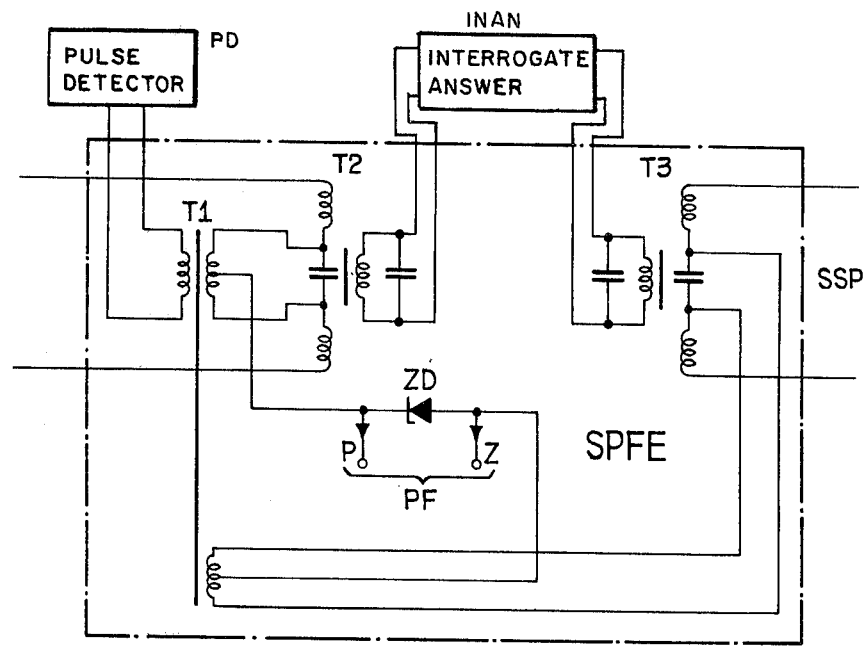
FIG. 3 Illustrates the dialling pulse and power-feed extraction arrangement.

Referring now to FIG. 3, this shows the circuit arrangements of signalling and power-feed extraction from the supervisory pair SSP. This circuit is applicable to FIG. 1, in particular, as indicated SPFE. It is also applicable to FIG. 4, as regards the power extraction function and the signal extraction of interrogate and answer signals, but not in respect of dialled pulses. In FIG. 4 although the supervisory pair SSP, the error detector ED, circuit interrogate and answer INAN circuit, and oscillator OSC, are not shown it should be assumed that they are as shown in FIG. 1.

In FIG. 3 transformers T2 and T3 provide coupling for the 'interrogate' and 'answer' signals from the supervisory pair to the interrogate and answer circuit INAN. Dialled pulses are extracted by way of transformer T1 and fed to the pulse detector PD. Transformer T1 together with transformer T3 serve to extract a power-feed PF, from across Zener diode ZD at terminals P and Z, for ancillary circuits associated with the supervisory circuitry following well established practice for transmission systems of this kind.

It should be understood that although this invention has been described in connection with a one-directional data transmission-path system the invention is also applicable to both way data transmission path system. In this event additional supervisory pairs will be required for each direction of transmission together with associated interrogate and answer circuits and pulse detector circuits as appropriate.

What we claim is:

1. A supervisory system for fault location during transmission of data in a digital data transmission system, the transmission system including a plurality of separate data transmission paths connecting two terminal stations with each transmission path incorporating a plurality of repeaters connected therein, and each repeater including at least one regenerator, and the supervisory system, which is provided in common to serve corresponding repeaters in separate transmission paths, comprises in combination;

selection means including a selector and a plurality of remotely-controllable switch means for each transmission path, the selection means being controlled by at least one command signal from the terminal station at one or other of the ends of the transmission paths;

an error detecting means for detecting the absence of an output from the regenerators, and when an error-rate-limit has been reached in respect of digital transmission code violations;

separate supervisory path means provided for the transmission of interrogation and answer signals for determining the status of the error detector means; and the supervisory system being such that the selection means is controlled by an appropriate command signal to selectively operate one of the switch means to connect one of the data transmission paths exclusively to the error detecting means.

2. A supervisory system, as claimed in claim 1 and further comprising in combination;

pulse detector means for detecting dialling-pulses modulated on an audio frequency and embodied in the command signal which is transmitted over the separate supervisory path means; and the supervisory system also being such that the selector is stepped in accordance with the number of dialling-pulses received by the pulse detector means.

3. A supervisory system as claimed in claim 2 wherein each dialling pulse consists of two frequencies transmitted simultaneously.

4. A supervisory system as claimed in claim 1 and further comprising in combination;

low pass and high pass filter means connected to each transmission path means and including a detector means connected to the low pass filter means; and the supervisory system being such that when the command signal in the form of an audio tone is received by the supervisory system, over a data transmission path, the appropriate low pass filter means and the detector means extract the audio tone to actuate the associated switch means, whereby data from the trnsmission path under test is extracted by the appropriate high pass filter means and applied to the error detection means.

* * * * *